US 7,590,608 B2

(12) United States Patent
Li et al.

(10) Patent No.: US 7,590,608 B2
(45) Date of Patent: Sep. 15, 2009

(54) ELECTRONIC MAIL DATA CLEANING

(75) Inventors: Hang Li, Beijing (CN); Yunbo Cao, Beijing (CN); ZhaoHui Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/293,469

(22) Filed: Dec. 2, 2005

(65) Prior Publication Data
US 2007/0130263 A1 Jun. 7, 2007

(51) Int. Cl.
*G06N 5/00* (2006.01)
*G06F 17/00* (2006.01)

(52) U.S. Cl. .......................... 706/45; 709/206; 709/224; 704/10

(58) Field of Classification Search .................. 706/45; 709/206, 224; 704/10
See application file for complete search history.

(56) References Cited

U.S. PATENT DOCUMENTS

| | | | | |
|---|---|---|---|---|
| 5,884,266 | A * | 3/1999 | Dvorak ..................... | 704/270.1 |
| 6,842,773 | B1 * | 1/2005 | Ralston et al. .............. | 709/206 |
| 2005/0108001 | A1 * | 5/2005 | Aarskog ...................... | 704/10 |

OTHER PUBLICATIONS

A. L. Berger, S. A. Della Pietra, and V. J. Della Pietra, A Maximum Entropy Approach to Natural Language Processing, In Computational Linguistics, 22:39-71, 1996.

E. Brill and R. C. Moore. An improved error model for noisy channel spelling correction. In Proc. of the 38th Annual Meeting of the ACL, 2000, pp. 286-293.

H. L. Chieu and H. T. Ng. A Maximum Entropy Approach to Information Extraction from Semi-Structured and Free Text. In Eighteenth national conference on Artificial intelligence, 2002.

K. Church and W. Gale. Probability scoring for spelling correction. In Statistics and Computing, vol. 1, 1991, pp. 93-103.

A. Clark. Pre-processing very noisy text, Proceedings of Workshop on Shallow Processing of Large Corpora, Corpus Linguistics 2003, Lancaster. (2003).

M. Collins. Discriminative Training Methods for Hidden Markov Models: Theory and Experiments with Perceptron Algorithms. In Conference on Empirical Methods in NLP, 2002.

C. Cortes and V. Vapnik. Support-vector networks. Machine Learning 20:273-297, 1995.

N. Ducheneaut and V. Bellotti. E-mail as Habitat: An Exploration of Embedded Personal Information Management. Interactions, 8. 30-38.

W. A. Gale, K. W. Church, and D. Yarowsky. 1994. Discrimination decisions for 100,000-dimensional spaces. Current Issues in Computational Linguistics, pp. 429-450.

(Continued)

*Primary Examiner*—David R Vincent
*Assistant Examiner*—Kalpana Bharadwaj
(74) *Attorney, Agent, or Firm*—Joseph R. Kelly; Westman, Champlin & Kelly, P.A.

(57) ABSTRACT

A cascaded processing approach is used to clean noisy electronic mail or other text messaging data. Non-text filtering is first performed on the noisy data to filter out non-text items in the data. Text normalization is then performed on the filtered data to provide cleaned data. The cleaned data can be used in one or more of a wide variety of other applications or processing systems.

18 Claims, 10 Drawing Sheets

OTHER PUBLICATIONS

H. Galhardas, D. Florescu, D. Shasha, and E. Simon. Declaratively cleaning your data using AJAX. In Journees Bases de Donnees, Oct. 2000. http://caravel.inria.fr/~galbarda/BDA.ps.

Z. Ghahramani and M. I. Jordan. Factorial Hidden Markov Models. Machine Learning, 29:245-273.

A. R. Golding and D. Roth. Applying winnow to context-sensitive spelling correction. In Proceedings of the 13th International Conference on Machine Learning (ICML 1996).

M. A. Hernández and S. J. Stolfo. Real-world Data is Dirty: Data Cleansing and The Merge/Purge Problem. Publisher Kluwer Academic Publishers Hingham, MA, USA. vol. 2, Issue 1 (Jan. 1998). 9-37.

N. Kushmerick. Learning to remove Internet advertisement. Proceedings of the Third International Conference on Autonomous Agents (Agents'99). ACM Press. Seattle, WA, USA. 1999. 175-181.

J. Lafferty, A. McCallum, and F. Pereira. Conditional random fields: Probabilistic models for segmenting and labeling sequence data. In ICML 01, 2001.

L. V. Lita, A. Ittycheriah, S. Roukos, and N. Kambhatla. tRuEcasIng. In Proceedings of the 41st Annual Meeting of the Association for Computational Linguistics (ACL 2003), Jul. 7-12, Sapporo, Japan.

A. McCallum, D. Freitag, and F. Pereira. Maximum Entropy Markov Models for Information Extraction and Segmentation, In Proceedings of the ICML Conference, 2000.

A. Mikheev. Periods, capitalized words, etc. Computational Linguistics, 28(3):289-3.18.

D. D. Palmer and M. A. Hearst. Adaptive multilingual sentence boundary disambiguation. Computational Linguistics. MIT Press Cambridge, MA, USA. vol. 23, Issue 2 (Jun. 1997). pp. 241-267.

C. Parent, and S. Spaccapietra. Issues and Approaches of Database Integration. Comm. ACM 41(5):166-178, 1998.

D. Pinto, A. McCallum, X. Wei, and W. B. Croft. Table Extraction Using Conditional Random Fields. In Proceedings of the 26th annual international ACM SIGIR conference on Research and development in information retrieval, 2003.

E. Rahm and H. H. Do. Data Cleaning: Problems and Current Approaches, IEEE Bulletin of the Technical Committee on Data Engineering, vol. 23 No. 4, Dec. 2000.

A. Ratnaparkhi. Unsupervised Statistical Models for Prepositional Phrase Attachment. In Proceedings of COLINGACL98. Montreal, Canada, 1998.

R. Sproat, A. Black, S. Chen, S. Kumar, M. Ostendorf, and C. Richards. Normalization of non-standard words. WS'99 Final Report http://www.clsp.jhu.edu/ws99/projects/normal/.

E. Xun, C. Huang, and M. Zhou. A unified statistical model for the identification of English baseNP. ACL-2000: The 38th Annual Meeting of the Association for Computational Linguistics, Hong Kong, Oct. 3-6, 2000.

L. Yi and B. Liu, and X. Li. Eliminating Noisy Information in Web Pages for Data Mining. In Proceedings of the ACM SIGKDD International Conference on Knowledge Discovery & Data Mining (KDD-2003), Washington, DC, USA, Aug. 24-27, 2003.

L. Zhang, Y. Pan, and T. Zhang. Recognising and using named entities: Focused named entity recognition using machine learning. In SIGIR'04, 2004.

J. Decker. eClean 2000, http://www.jd-software.com/eClean2000/index.html.

ListCleaner Pro. http://www.WinPure.com/EmailCleaner.

* cited by examiner

ELECTRONIC MAIL DATA CLEANING

BACKGROUND

Currently, electronic mail (email) and text messaging are some of the most common means for communication using text. Some estimates indicated that even an average computer user receives 40-50 electronic mail messages per day. For this reason, performing text mining applications (such as document content analysis, email routing in the application of customer care and support, filtering, summarization, information extraction, news group analysis, etc.) on electronic mail and other messages may be highly desirable. However, such applications require receiving electronic mail messages and text messages as inputs in order to perform such applications.

Unfortunately, electronic mail data, and text messaging data, can be very noisy. For instance, it may contain headers, signatures, quotations from previous electronic mails in a string of messages, and program code. The data may contain extra line breaks, extra spaces, special character tokens, and it may have spaces and periods within it that are extra and must be removed or they maybe missing. It may also contain words that are badly cased, or even non-cased, and words that are misspelled.

Some current text mining products have electronic mail data cleaning features. However, these products have conventionally been single-pass cleaning techniques that identify and remove a very limited number of noise types. They are currently rules-based systems, wherein the rules are defined by users.

Cleaning of noisy data has also been addressed in the research community. However, most of this work has been done primarily on structured tabular data. In natural language processing contexts, for instance, sentence boundary detection, case restoration, spelling error correction, and word normalization have been studied, but primarily as separate and unrelated issues, and not in relation to email or text messaging The discussion above is merely provided for general background information and is not intended to be used as an aid in determining the scope of the claimed subject matter.

SUMMARY

A cascaded processing approach is used to clean noisy electronic mail or other text messaging data. Non-text filtering is first performed on the noisy data to filter out non-text items in the data. Text normalization is then performed on the filtered data to provide cleaned data. The cleaned data can be used in one or more of a wide variety of other applications or processing systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present subject matter deals with cleaning electronic mail and other text messaging data (herein after referred to as electronic mail or email messages). However, before describing the present subject matter in more detail, one illustrative environment in which the present subject matter can be deployed will be described.

Figure 1:
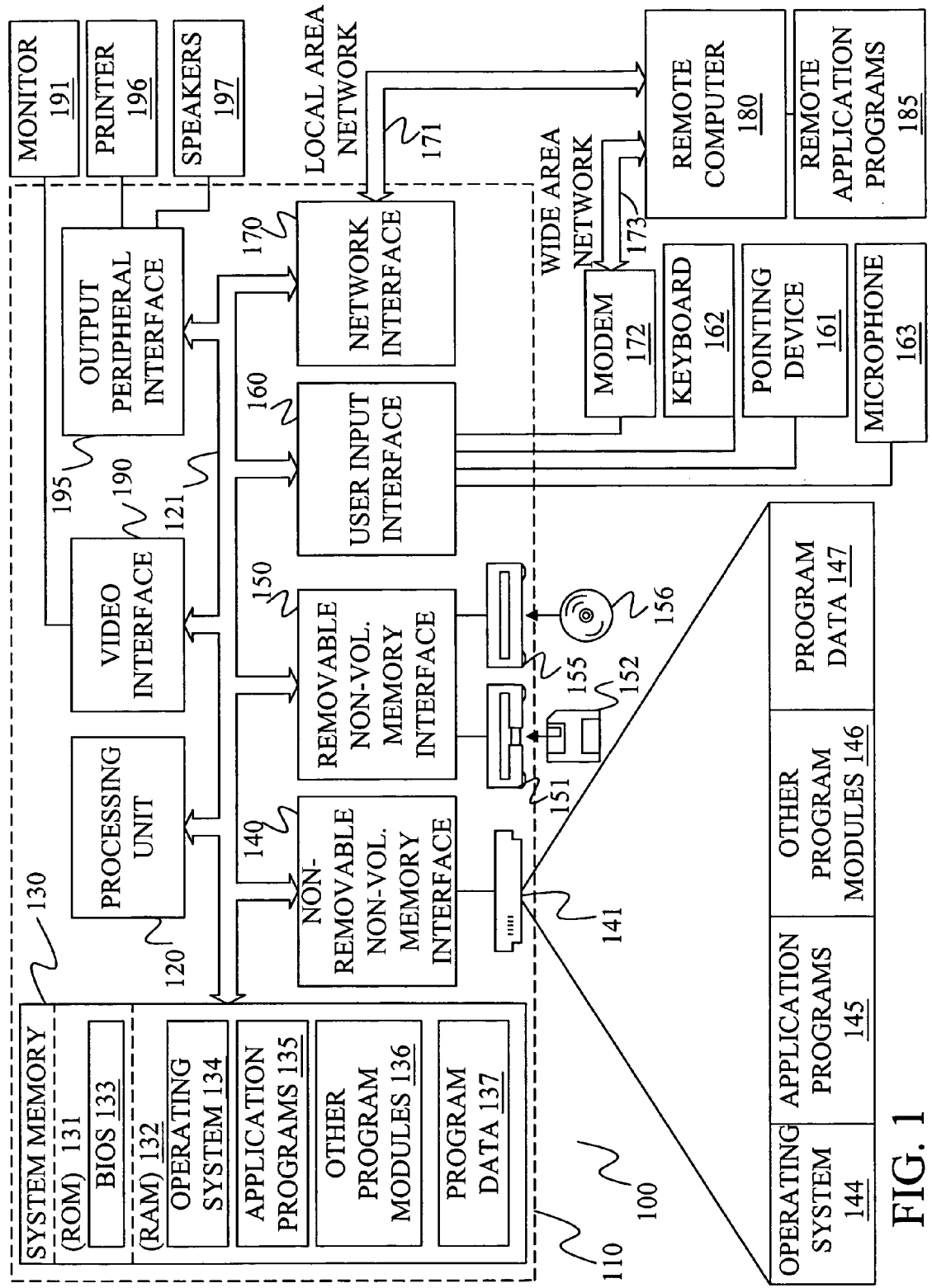
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
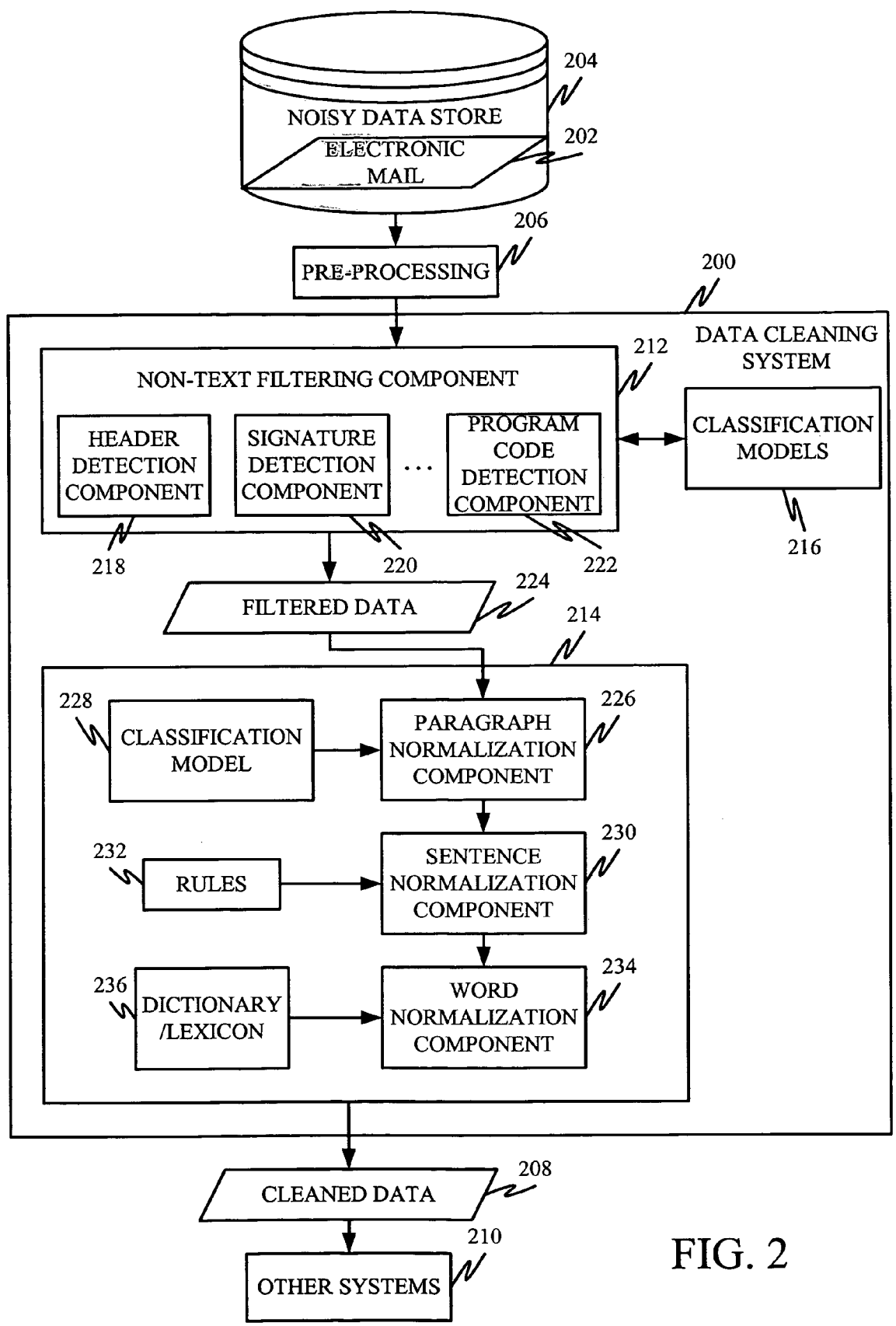
FIG. 2 is a block diagram of a data cleaning system in accordance with one embodiment.

FIG. 2 is a block diagram of one illustrative data cleaning system 200. FIG. 2 shows that electronic mail 202 stored in a noisy data store 204 and is provided to preprocessing component 206 for preprocessing. The preprocessed data is then provided to system 200 where it is cleaned and the resultant cleaned data 208 is output to one of a wide variety of other systems or applications 210.

In the embodiment shown in FIG. 2, data cleaning system 200 includes non-text filtering component 212 and text normalization system 214. In the embodiment shown in FIG. 2, non-text filtering component 212 includes header detection component 218, signature detection component 220 and program code detection component 222. Components 218, 220 and 222 are used to identify and remove non-text items from the preprocessed electronic mail 202. Component 218, 220 and 222 in non-text filtering component 212 access classification models 216 to filter the non-text data, such as header information, signatures, quotations, program code, etc. Component 212 then outputs the data as filtered data 224.

Text normalization system 214 receives filtered data and performs further cascaded processing to normalize, or clean, the text in filtered data 224. In one embodiment, text normalization system 214 includes paragraph normalization component 226 that accesses a classification model 228, sentence normalization component 230 that accesses a set of rules 232, and word normalization component 234 that accesses a dictionary or lexicon 236. The operation of components 226, 230 and 234 is discussed in greater detail below. Briefly, however, in one embodiment, paragraph normalization component 226 identifies extra line breaks in the text, and removes them. Sentence normalization component 230 determines whether punctuation (such as a period, a question mark, or an exclamation mark) is a real sentence-ending punctuation mark. If so, that is identified as a sentence boundary. In addition, component 230 illustratively removes non-word items, such as non-ASCII words, tokens containing special symbols and lengthy tokens, and identifies the location of those tokens as sentence boundaries. Word normalization component 234 illustratively conducts case restoration on badly cased, or non-cased words.

It is believed that the cascaded approach illustrated in FIG. 2 may be beneficial. For instance, removing noisy blocks first may be desired, because such blocks are not needed in later processing. Normalizing text from paragraph to sentence and then to word may also be desirable because there may well be dependencies between those processes. For instance, word normalization (such as case restoration) often performs better when provided with information that indicates the beginning of a sentence. Paragraph normalization (such as identifying the ends of paragraphs) can also provide useful information for sentence normalization.

In any case, once clean data 208 is provided, it can be used by other systems 210. A large number of other systems 210 can use clean data. Some, by way of example only, include analysis of trends in email, automatic routing of email messages, automatic filtering of SPAM emails, summarization of emails, information extraction from emails, and analysis of trends in news group discussions (i.e., news group articles are often sent as emails).

Before describing one illustrative embodiment of the operation of system 200 in more detail, an example may be helpful. Table 1 illustrates one exemplary noisy email message. It can be seen that the message in Table 1 includes headers, signatures, and badly cased information.

TABLE 1

1. On Mon, 23 Dec 2002 13:39:42 -0500, "Brendon"
2. <brendon@nospamitology.net> wrote:
3. NETSVC.EXE from the NTReskit. Or use the
4. psexec from
5. sysinternals.com. this lets you run
6. commands remotely - for example net stop 'service'.
7. --

TABLE 1-continued

8. -------------------------------------
9. Best Regards
10. Brendon
11.
12. Delighting our customers is our top priority. We welcome your comments and
13. suggestions about how we can improve the support we provide to you.
14. -------------------------------------
15. >>-----Original Message-----
16. >>"Jack" <jehandy@verizon.net> wrote in message
17. >>news:00a201c2aab2$12154680$d5f82ecf@TK2MSFTNGXA12...
18. >> Is there a command line util that would allow me to
19. >> shutdown services on a remote machine via a batch file?
20. >>Best Regards
21. >>Jack Table 2 is an example of a cleaned email message.

TABLE 2

1. NETSVC.EXE from the NTReskit. Or use the psexec from sysinternals.com.
2. This lets you run commands remotely - for example net stop 'service'.

More specifically, lines 1 and 2 of the noisy email message shown in Table 1 are a header; lines 7-14 are a signature; and a quotation lies from line 15 to line 21. All of these will generally be deemed irrelevant to text mining in many types of applications. In fact, only lines 3-6 are actual textual content. However, even that text is not in standard form. It is mistakenly separated by extra line breaks, and the word "this" in line 5 is not properly capitalized (it is badly cased).

Table 2 shows an exemplary output of system 200 in the form of a clean email. Table 2 shows that the non-text parts of the message shown in Table 1 (the header, signature and quotation) have all been removed. The text has also been normalized. Specifically, the extra line breaks have been eliminated, and the case of the word "this" has been correctly restored to "This".

Figure 3:
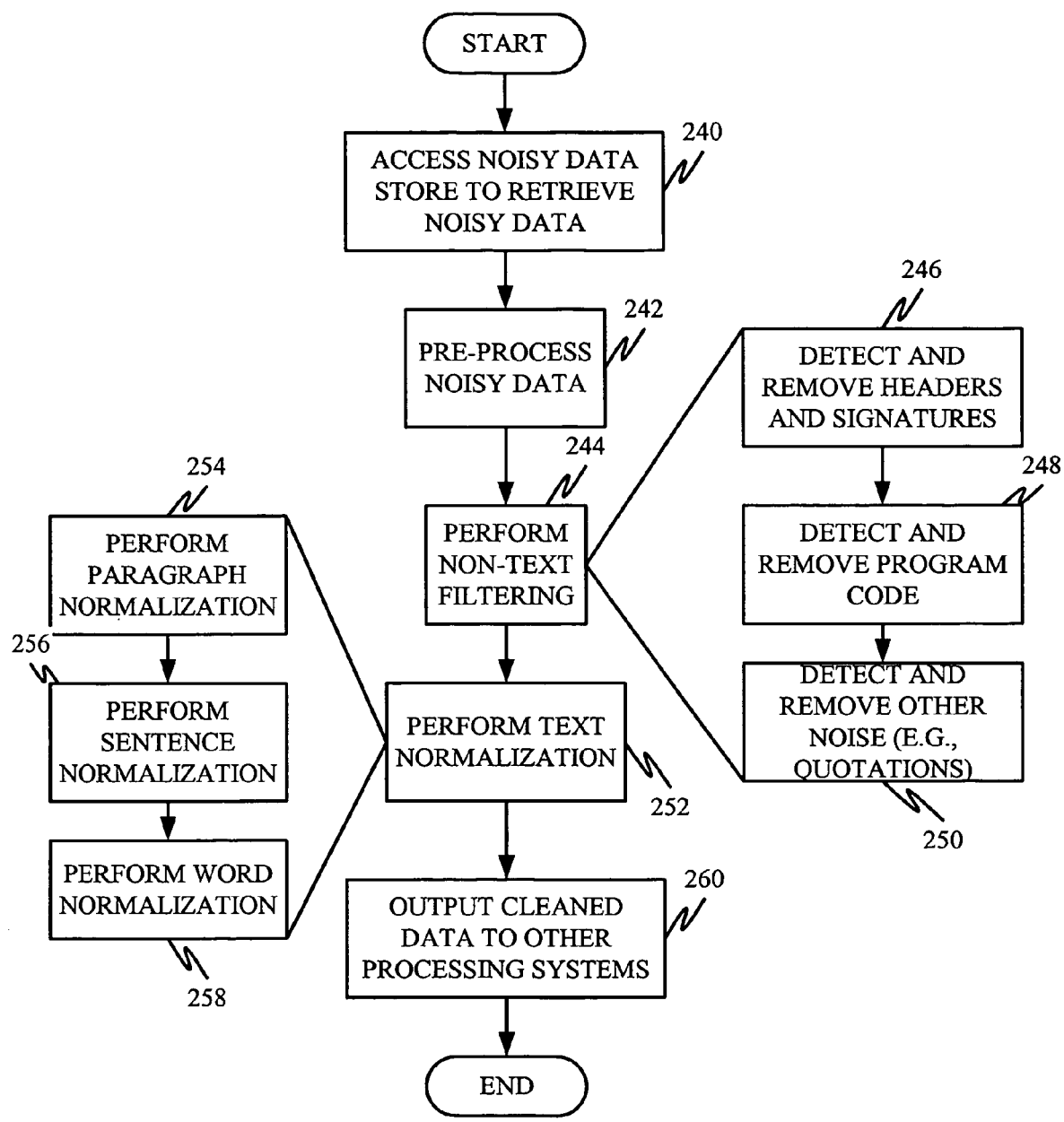
FIG. 3 is a flow diagram illustrating one embodiment of the operation of the system shown in FIG. 2.

FIG. 3 is a flow diagram illustrating one illustrative embodiment of the operation of system 200 shown in FIG. 2. First, preprocessing component 206 accesses electronic mail 202 and preprocesses electronic mail 202. Accessing electronic mail 202 is indicated by block 240 in FIG. 3, and preprocessing the noisy data in electronic mail 202 is indicated by block 242.

In one illustrative embodiment, preprocessing component 206 uses patterns to recognize special words, such as electronic mail addresses, internet protocol (IP) addresses, uniform resource locators (URLs), dates, file directories, numbers (such as 5.42), money (such as $100), percentages (such as 92.86%), and words containing special symbols (such as C#, .NET,.doc, Dr.). Preprocessing component 206 can also use rules in order to recognize bullets and list items (such as (1), b), etc.). The preprocessing discussed is exemplary and optional, and different or additional preprocessing can be used as well.

Non-text filtering component 218 then performs non-text filtering on the preprocessed data. This is indicated by block 244 in FIG. 3. More specifically, in one embodiment, header detection component and signature detection component 220 detect and remove headers and signatures from the preprocessed data. This is indicated by block 246. Program code detection component 222 detects and removes program code from the preprocessed data. This is indicated by block 248. Finally, any other types of noise (such as quotations, etc.) can be detected and removed by a suitable component in non-text filtering component 212. This is indicated by block 250 in FIG. 3.

In performing this non-text filtering, component 212 illustratively accesses one or more classification models 216. Classification models 216 are illustratively trained (as indicated in more detail below with respect to FIG. 8) to identify the non-text items to be removed from the noisy data.

Once non-text filtering component 212 has identified and removed all undesired non-text items, the filtered data 224 is provided to text normalization system 214. Text normalization system 214 performs text normalization on the filtered data 224. This is indicated by block 252 in FIG. 3. More specifically, in one embodiment, text normalization system 214 includes paragraph normalization component 226 that accesses classification model 228 to perform paragraph normalization on the filtered data 224. This is indicated by block 254 in FIG. 3.

Sentence normalization component 230 accesses a set of rules 232 to perform sentence normalization on the paragraph-normalized data. This is indicated by block 256 in FIG. 3.

Word normalization component 234 accesses a dictionary or lexicon 236 and performs word normalization on the sentence-normalized data. This is indicated by block 258 in FIG. 3.

The cleaned data 208 is then output to other systems 210. This is indicated by block 260 in FIG. 3.

In one embodiment, header and signature detection are considered as similar problems. Both are viewed as reverse information extraction. In other words, headers and signatures are identified within the text, and then removed.

Figure 4A:
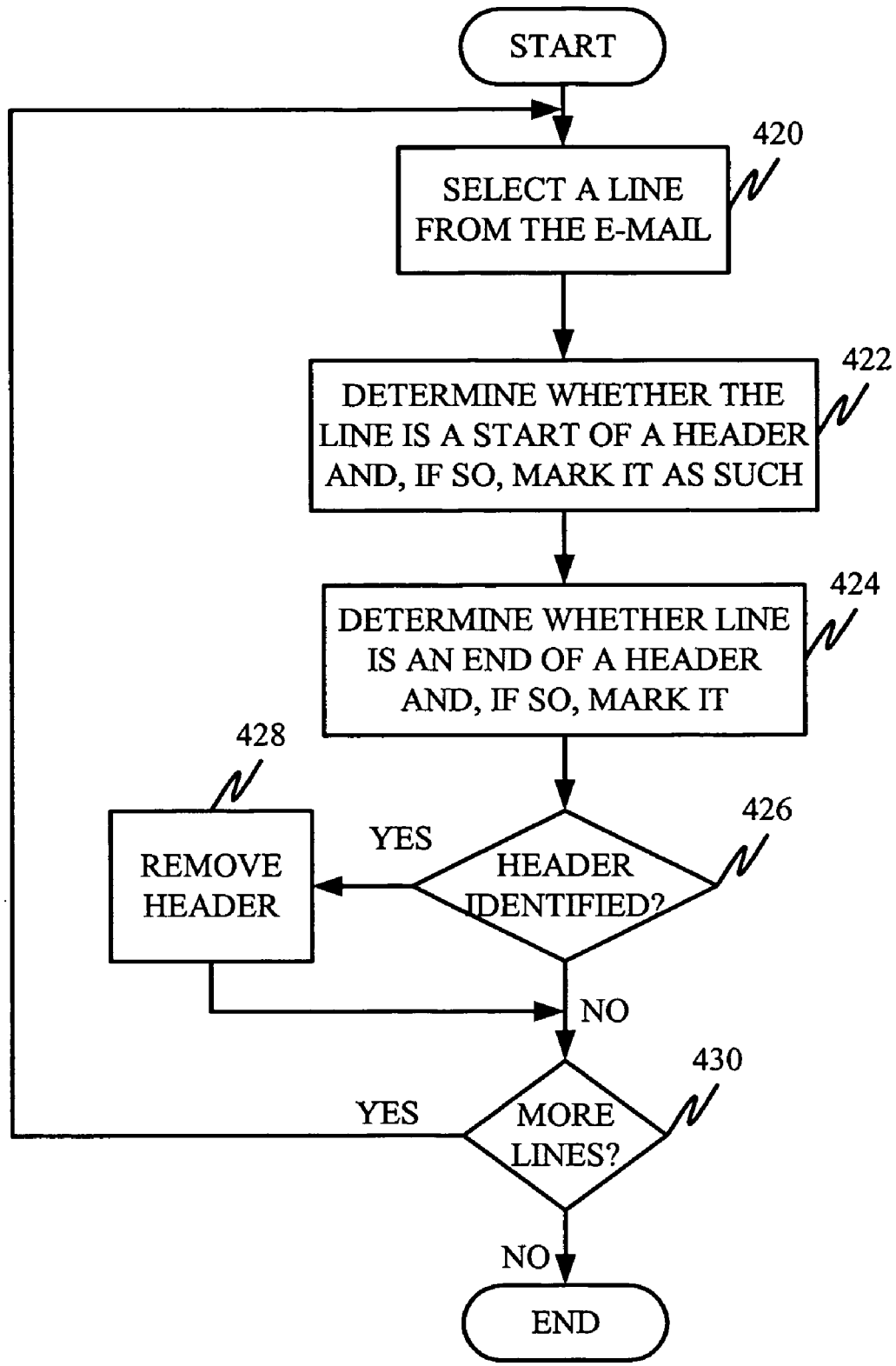
FIG. 4A is a flow diagram illustrating one embodiment of header detection and removal.
Figure 4B:
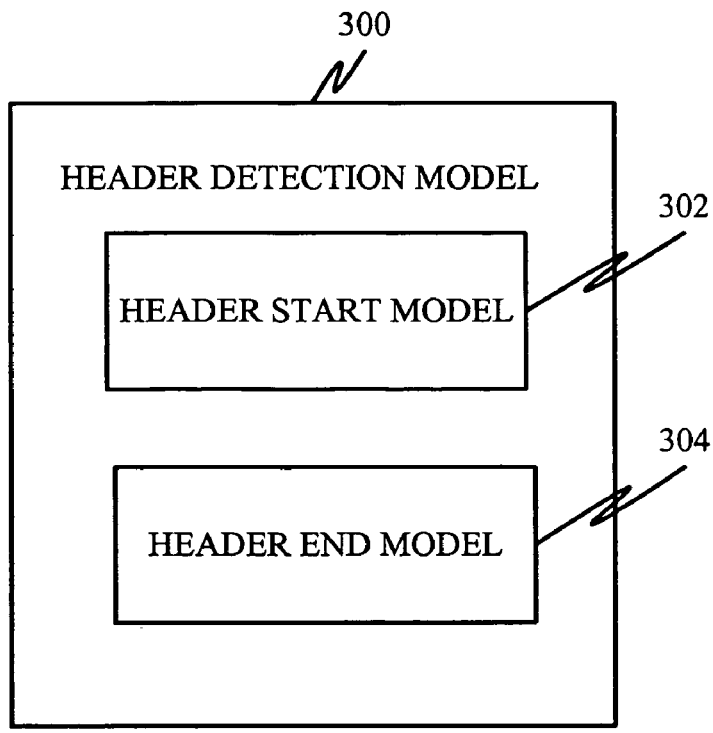
FIG. 4B is a block diagram of one illustrative embodiment of a header detection model.

In one illustrative embodiment, header detection component 218 determines whether a line in the email message it is processing is the start line of a header or an end line of a header. In one illustrative embodiment, it does this using header detection model 300 shown in FIG. 4B. Model 300 illustratively includes a header start model 302 and a header end model 304. In one embodiment, models 302 and 304 are classifiers, such as support vector machines, but a wide variety of other models could be used as well. For instance, Hidden Markov Models, maximum entropy models, maximum entropy Markov models, conditional random fields, and voted perceptron models, can all be used as information extraction models which can be used to identify the non-text items, such as headers, signatures, quotations, program code, etc. In the embodiment discussed herein, support vector machines will be discussed by way of example only, and the invention is not so limited.

In any case, header start model 302 illustratively determines whether the line being processed is the start of a header, and header end model 304 determines whether it is the end of a header. Header detection component 218 thus processes an email message as shown in the flow diagram in FIG. 4A.

First, component 218 selects a line from the email message. This is indicated by block 420 in FIG. 4A. Next, models 302 and 304 determine whether the selected line is a start of a header or an end of a header. If it is either the start or end of a header it is marked as such. This is indicated by blocks 422 and 424 in FIG. 4A. Component 218 then determines whether a header has been identified (i.e., whether the beginning and ending of a header have been located). This is indicated by block 426. If so, the header is removed as indicated by block 428 and processing continues at block 430 where component 218 determines whether there are any more lines in the email message to be processed. If so, processing reverts back to block 320. If not, the email message has been processed with respect to headers. Similarly, if, at block 426, a header has not been identified, then processing moves to block 430 where component 218 determines whether any additional lines in the email message need to be processed.

In identifying the starting and the ending of a header, models 302 and 304 are illustratively trained, and perform detection, based on a plurality of features. Each line in the email message being processed by models 302 and 304 is viewed as an instance. Training is discussed in detail below. Briefly, however, in training, for each instance, a set of features is defined and assigned a label. The label represents whether the line being processed is the start of a header, the end of a header, or neither. This data is used to train the model given the features. Table 3 illustrates one exemplary set of features that can be used to train models 302, and 304, and to detect headers as described above. Others can be used, of course.

TABLE 3

Features in Header Detection Models

The features are used in both the header-start and header-end SVM models or other classification models such as Naive Bayes, decision trees or Neural network.
Position Feature: The feature represents whether the current line is the first line in the email.
Positive Word Features in English: The three features represent whether the current line begins with words like "From:", "Re:", "In article", and "In message", contains words such as "original message", or ends with words like "wrote:" and "said:". These words are language specific.
Negative Word Feature in English: The feature represents whether the current line contains words like "Hi", "dear", "thank you", and "best regards". The words are usually used in greeting and should not be included in a header.
Number of Words Feature: The feature stands for the number of words in the current line.
Person Name Feature: This feature represents whether the line contains a persons name.
Ending Character Features: The feature represents whether the current line ends with colon, quotation mark or other special characters. (The first line of a header is likely to end with such characters.)
Special Pattern Features: In the preprocessing step, the special words have already been recognized. Each of the features represents whether the current line contains one type of special words. Positive types include email address and date. Negative types include money and percentage.
Number of Line Breaks Features: The two features respectively represent how many line breaks exist before and after the current line.

Figure 5B:
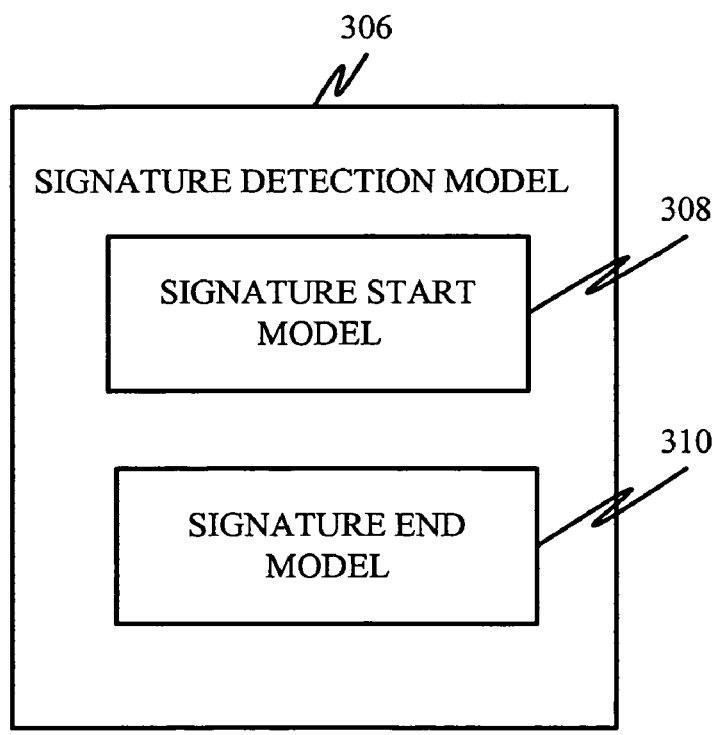
FIG. 5B is a block diagram of one illustrative embodiment of a signature detection model.
Figure 5A:
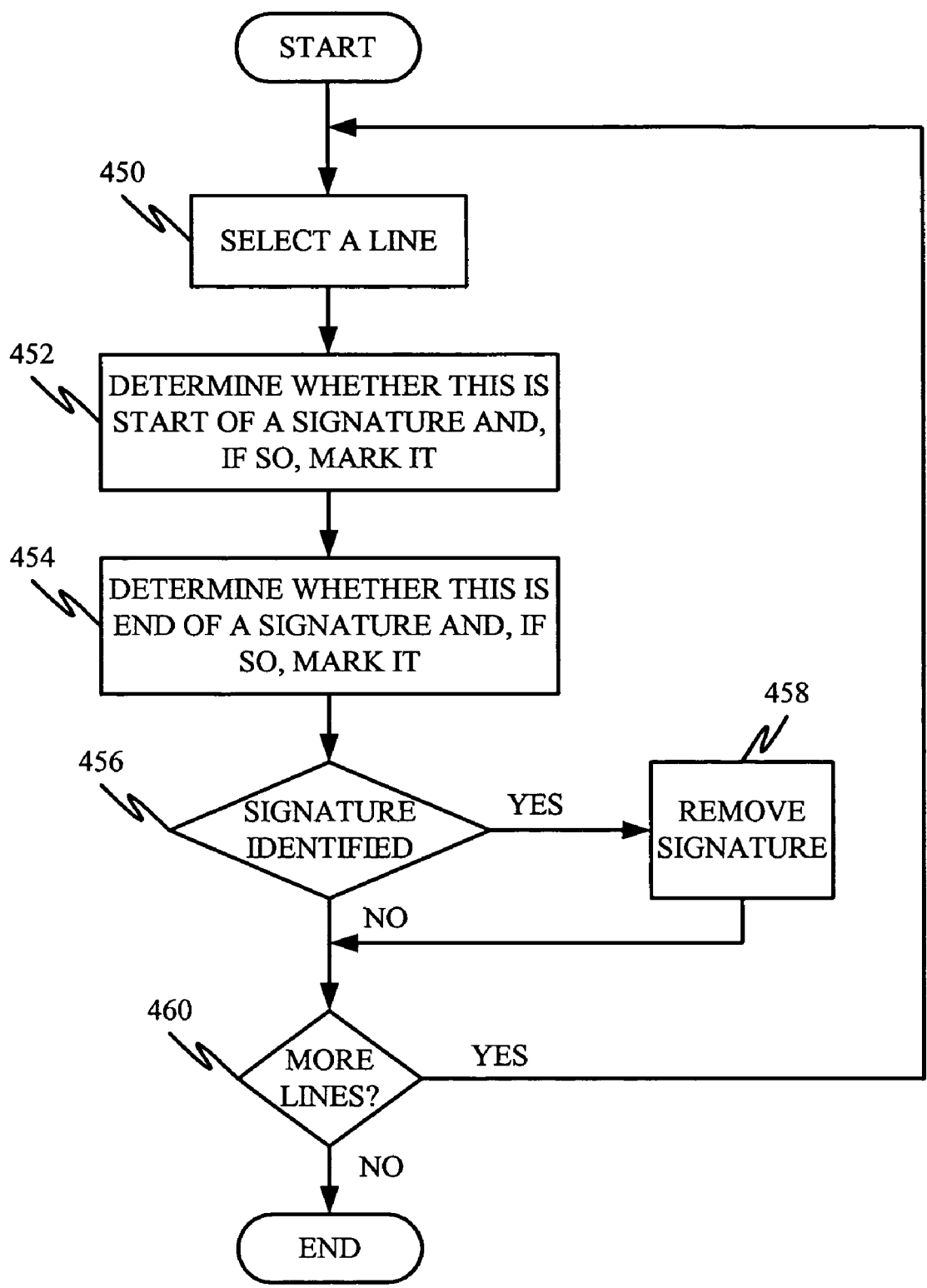
FIG. 5A is a flow diagram illustrating one illustrative embodiment of signature detection and removal.

FIG. 5A illustrates one embodiment of the operation of signature detection component 220 for detecting and removing signatures from an email being processed. Again, the email being processed can be processed line-by-line, using a signature detection model such as model 306 shown in FIG. 5B. Model 306 illustratively includes a signature start model 308 and a signature end model 310. Start model 308 identifies whether the line being processed is a start of a signature while end model 310 determines whether the line being processed is the end of a signature.

Component 220 thus first selects a line of the email. This is indicated by block 450 in FIG. 5A. Component 220 then determines whether the line is the start of a signature, and if so, it is marked as such. This is indicated by block 452. Component 220 then uses model 310 to determine whether the line being processed is the end of a signature, and if so, it is marked. This is indicated by block 454 in FIG. 5A.

Component 220 then determines whether a signature has been identified. That is, component 220 determines whether the beginning and ending of a signature have been identified. This is indicated by block 456. If so, the signature is removed at block 458, and processing continues at block 460. Also, if at block 456 it is determined that a signature has not been identified, processing moves on to block 460 as well. In block 460, component 220 determines whether there are any more lines to be processed for the email message. If so, process reverts back to block 450 where the next line is selected for processing. If not, the email has been fully processed by component 220. Table 4 shows one exemplary set of features that can be used to train models 308 and 310, and that can be used in detection.

Component 222 then determines whether a section of program code has been identified (i.e., whether its starting line and ending line has been identified). This is indicated by block 486. If so, the program code is removed as indicated by block 488. If program code has not been identified at block 486, or if it has been removed at block 488, processing moves to block 490 where component 222 determines whether there are more lines in the email message to be processed. If so, processing reverts back to block 480. If not, the entire email message has been processed by component 222.

In training models 314 and 316, and in using those models for the detection, a set of features are selected. One exemplary set of features is described below in Table 5.

TABLE 4

Features in Signature Detection Model

The features are used in both the signature-start and signature-end SVM models.
Position Feature: The feature is defined to represent whether the current line is close to the end of the email.
Positive Word Feature: The feature represents whether the current line contains only positive words like "Best regards", "Best wishes", and "Good luck".
Number of Words Feature: The feature stands for the number of words in the current line. The first line of a signature usually contains a few words, such as the author's name or words like "Best Regards", "Thanks".
Person Name Feature: This feature represents whether the line contains a persons name.
Ending Character Feature: The feature (negative feature) represents whether the current line ends with a punctuation mark. A signature usually does not end with a punctuation mark.
Special Symbol Pattern Feature: The feature indicates whether the line contain consecutive special symbols such as: "--------", "========", "********". Such patterns can be frequently found in signatures.
Case Features: The features represent the cases of the tokens in the current line. They indicate whether the tokens are all in upper-case, all in lower-case, all capitalized or only the first token is capitalized.
Number of Line Breaks Features: The two features respectively represent how many line breaks exist before and after the current line.

Figure 6A:
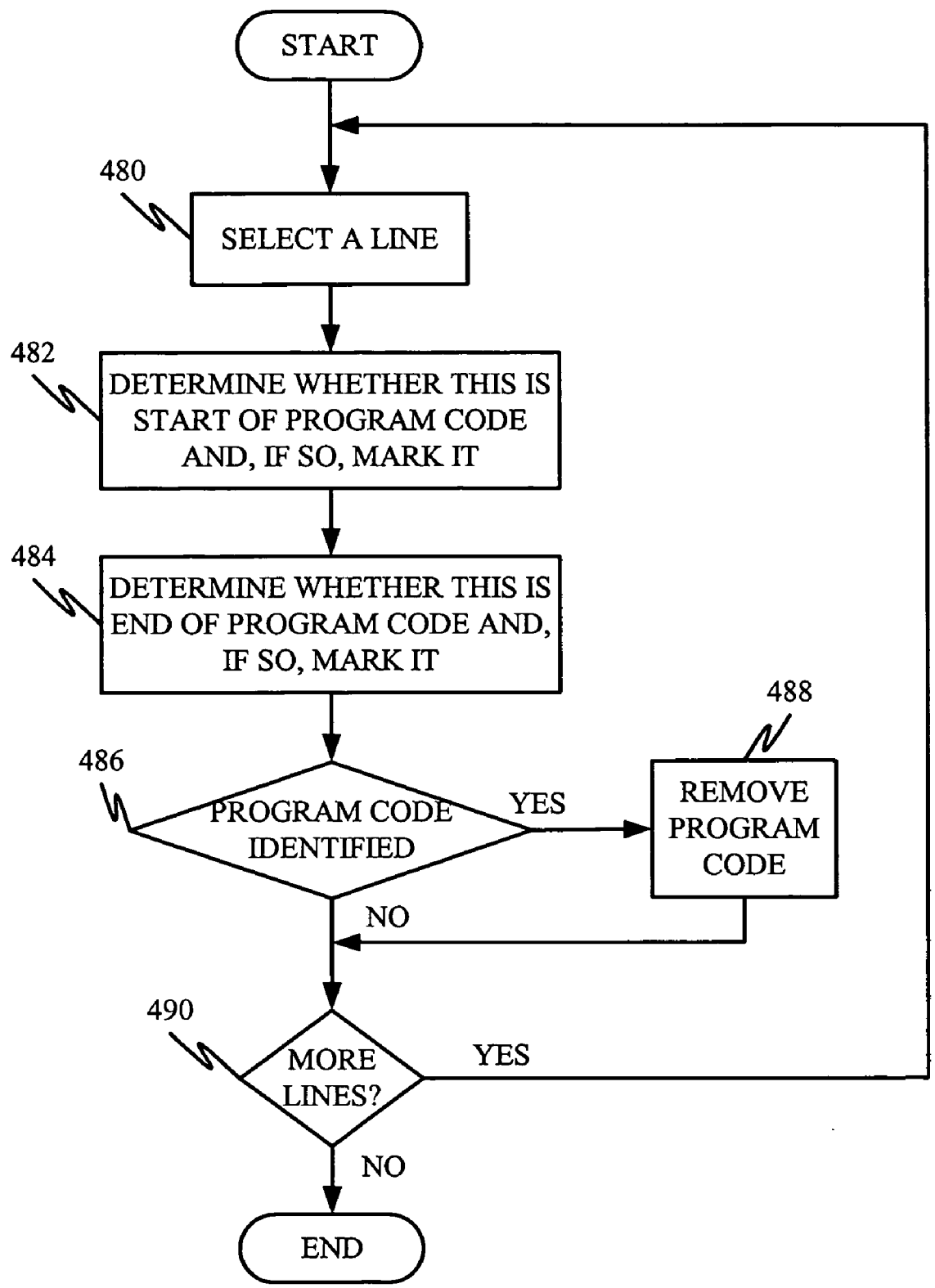
FIG. 6A is a flow diagram illustrating one illustrative embodiment of program code detection and removal.
Figure 6B:
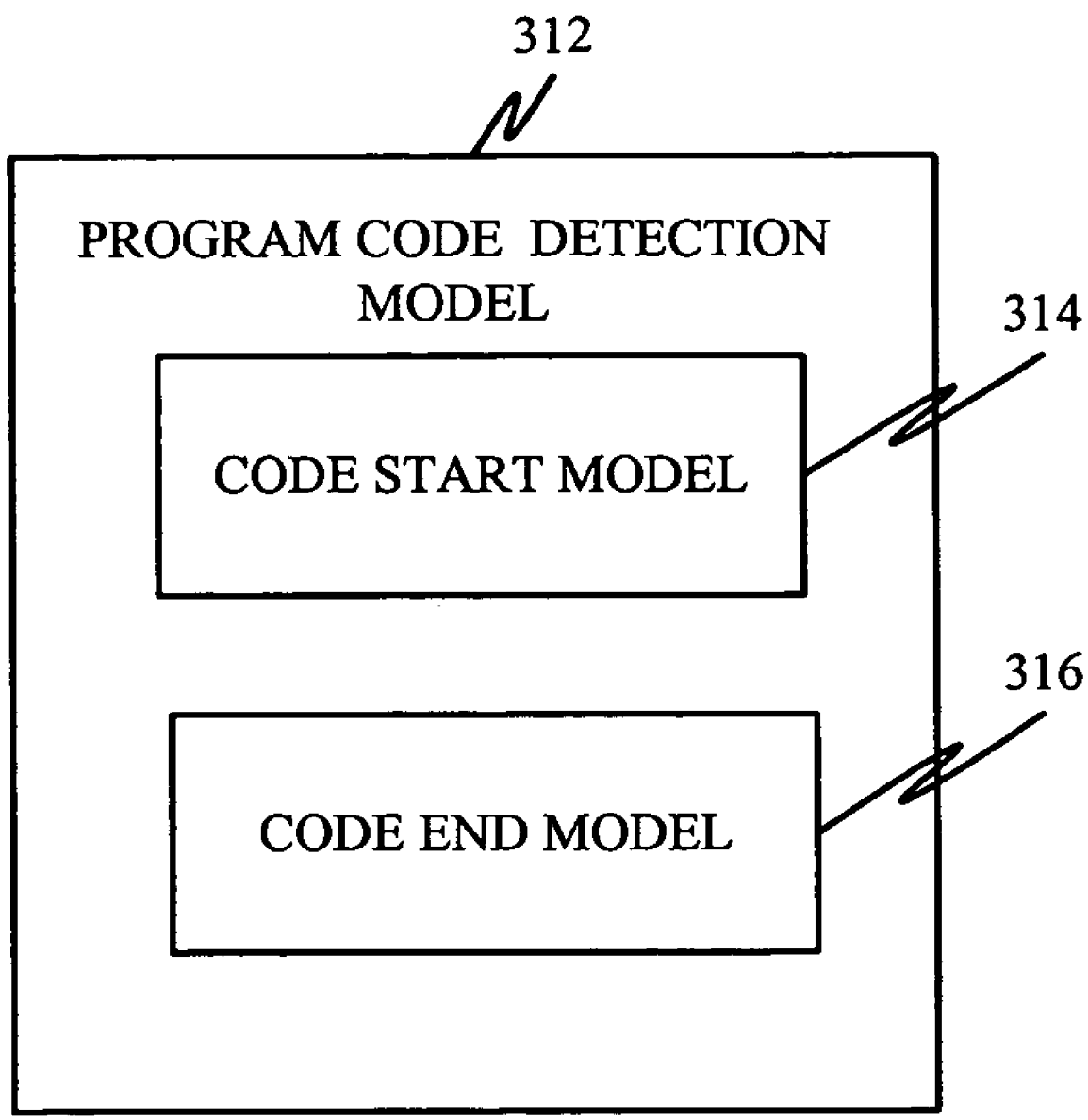
FIG. 6B is one illustrative block diagram of a program code detection model.

FIG. 6A is a flow diagram better illustrating one exemplary embodiment of the operation of program code detection component 222. Program code detection is similar to header and signature detection in that it is viewed as a reverse information extraction problem. Detection of program code is illustratively performed by identifying the start line and end line of a program using a program code detection model, such as model 312 shown in FIG. 6B. Model 312 illustratively comprises a code start model 314 and a code end model 316. Model 314 is illustratively a support vector machine that identifies the start line of program code, while code end model 315 is illustratively a support vector machine that identifies the end line of program code.

Component 222 thus first selects a line of an email message to be processed. This is indicated by block 480. Component 222 then uses code start model 314 to determine whether the selected line is the start of program code. If so, it is marked as such. This is indicated by block 482 in FIG. 6A. Component 222 then uses model 316 to determine whether the selected line is the end of program code. If so, it is marked, as indicated by block 484.

TABLE 5

Features in Program Code Detection Model

The following features are used in both the code-start and code-end models.
Position Feature: The feature represents the position of the current line.
Declaration Keyword Feature: The feature represents whether the current line starts with one of the keywords, including "string", "char", "double", "dim", "typedef struct", "#include", "import", "#define", "#undef", "#ifdef", and "#endif".
Statement Keyword Features: The four features represent
whether the current line contains patterns like "i++";
whether the current line contains keywords like "if", "else if", "switch", and "case";
whether the current line contains keywords like "while", "do{", "for", and "foreach";
whether the current line contains keywords like "goto", "continue;", "next;", "break;", "last;" and "return;".
Equation Pattern Features: The four features are defined for equations as follows:
whether the current line contains an equation pattern like "=", "<=" and "<<=";
whether the current line contains an equation pattern like "a=b+/*−c;";
whether the current line contains an equation pattern like "a=B(bb,cc);";
whether the current line contains an equation pattern like "a=b;".
Function Pattern Feature: The feature represents whether the current line contains function pattern, e.g., pattern covering "fread(pbBuffer,1, LOCK__SIZE, hSrcFile);".
Function Definition Features: The two features represent whether the current line starts with "sub" or "function", and whether it starts with "end function" or "end sub".
Bracket Features: The four features represent whether the line starts with or ends with "{" and whether the line starts with or ends with "}".
Percentage of Real Words Feature: The feature represents the percentage of 'real' words in the line that can be found in a dictionary.
Ending Character Features: Program code lines usually end with a semicolon ";", but seldom end with a question mark "?" or an exclamation mark "!". The two features are defined to represent whether the current line ends with a semicolon and whether the line ends with a question mark or an exclamation mark.
Number of Line Breaks Features: The two features respectively represent how many line breaks exist before and after the current line.

Figure 7:
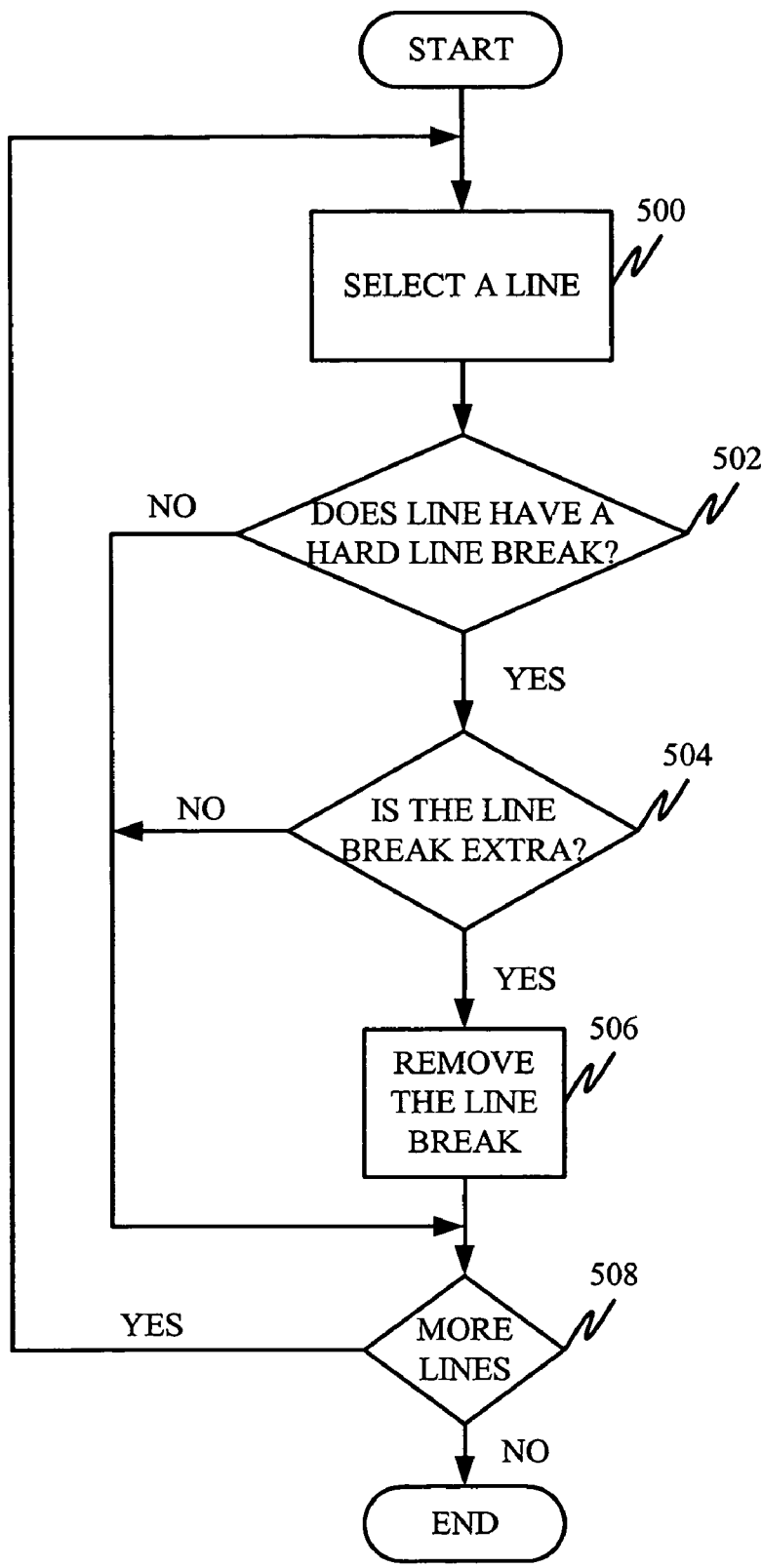
FIG. 7 is a flow diagram illustrating one illustrative embodiment of paragraph normalization.

After non-text filtering component 212 (shown in FIG. 2) filters the text, it provides filtered data to text normalization system 214 as described above. FIG. 7 is a flow diagram better illustrating one illustrative embodiment for performing paragraph normalization using paragraph normalization component 226 and classification model 228.

An email message may contain many line breaks. Component 226, using model 228, identifies whether each line break is a paragraph ending, or an extra line break, which is unneeded. This problem is viewed as that of classification, and illustratively employs a classifier, such as a support vector machine (or other model) to perform the task. If a line break is recognized as an extra line break, then it is removed. Otherwise, it is retained. In this way, the email message is segmented into normalized paragraphs. Again, as with the models discussed above with respect to FIGS. 4B, 5B and 6B, each line of the email is viewed as an instance. A set of features is defined and is used in training model 228 and in detection.

FIG. 7 is a flow diagram illustrating how paragraphs can be normalized in accordance with one embodiment. First, component 226 selects a line of the email message. This is indicated by block 500 in FIG. 7. Component 226 then determines whether the selected line has a hard line break. This is indicated by block 502. If so, component 226 determines whether that line break is extra. This is indicated by block 504 in FIG. 7. If the line break is extra, it is removed by component 226. This is indicated by block 506.

If, at either of blocks 502 or 504, it is determined that the line does not contain a hard line break or that the hard line break is not extra, processing moves to block 508, as it does from block 506. At block 508, component 226 determines whether there are any additional lines in the email to be processed. If so, processing reverts back to block 500 where the next line is selected. If not, then component 226 has processed all of the lines in the email message, and the processed data is passed to sentence normalization component 230.

In training and performing detection using model 228, a set of features are used. Table 6 describes one exemplary set of features that can be used with model 228.

TABLE 6

Features in Paragraph Ending Detection Model

The following features are defined in the paragraph-ending model.
Position Features: The two features represent whether the current line is the first line and whether it is the last line.
Greeting Word Feature: The feature represents whether the line contains greeting words like "Hi" and "Dear". (In such case, the line break should not be removed).
Ending Character Feature: The feature represents whether the current line ends with a colon ":".
Case Features: The two features represent whether the current line ends with a word in lower case letters and whether the next line starts with a word in lower case letters.
Bullet Feature: The feature represents whether the next line is the bullet of a list item. (In such cases, the line break should be retained)
Number of Line Breaks Feature: The feature represents how many line breaks exist after the current line.

Sentence normalization performed by component 230 and word normalization performed by component 234 illustratively detect sentence boundaries using rules 232 and perform word normalization, such as case restoration, spelling error correction, and other word normalization using dictionary or lexicon 236. All of these normalizations have been studied intensively with respect to natural language processing systems, and any desired techniques can be used to perform sentence normalization and word normalization. Therefore, they will not be described in greater detail.

Figure 8:
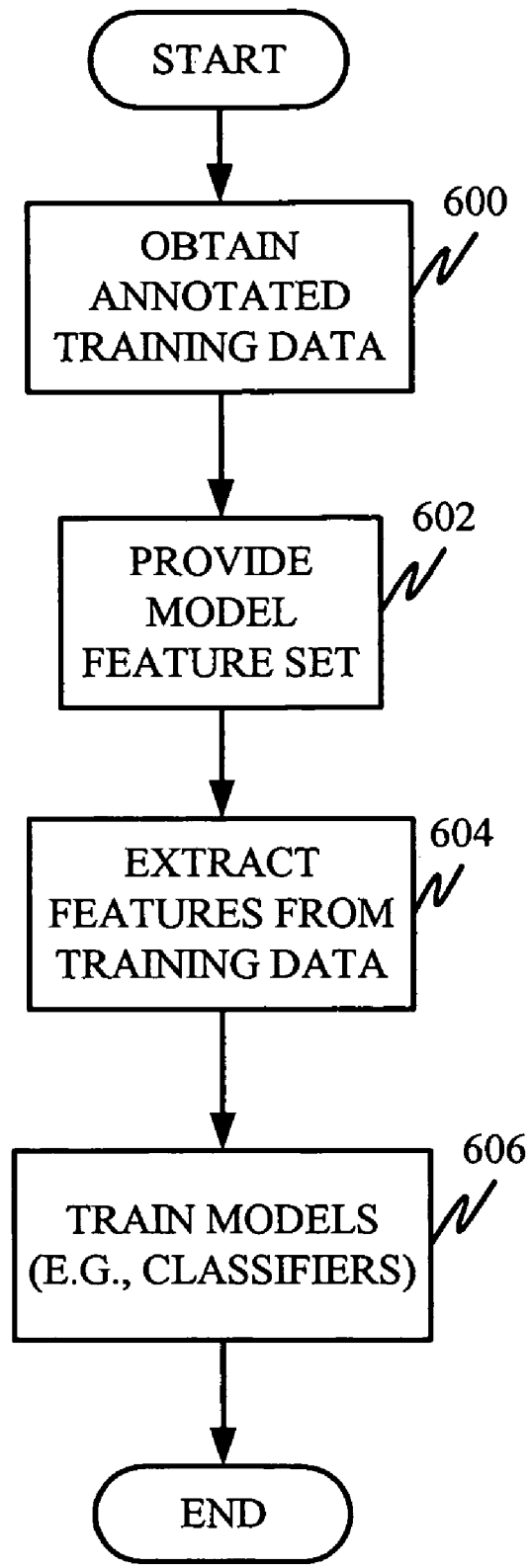
FIG. 8 is a flow diagram illustrating one illustrative embodiment for training non-text filtering and text normalization models.

FIG. 8 is a flow diagram illustrating one illustrative embodiment for training models 216 and 228. First, annotated training data is obtained, along with a model feature set. This is indicated by blocks 600 and 602 in FIG. 8. For instance, for a support vector machine classifier model, let $\{(x_i, y_i) \ldots (x_n, y_n)\}$ be a training data set in which $x_i$ denotes an instance (a feature vector) and $y_i \in [-1, +1]$ denotes a classification label. In learning, the system attempts to find an optimal separating hyper-plane that maximally separates the two classes of training instances (more precisely, maximizes the margins between the two classes of instances). The hyper-plane corresponds to a linear classifier (such as a linear SVM). It is theoretically certain that a linear classifier obtained in this way has small generalization errors. Linear SVMs, for example, can be further extended into non-linear SVMs by using kernel functions such as Gaussian and polynomial kernels. In one illustrative embodiment a polynomial kernel is used.

In any case, once the annotated training data is obtained and the model feature set is provided, a feature extraction component extracts features from the annotated training data. This is indicated by block 604 in FIG. 8. The extracted features are used to train the models (e.g., classifiers). This is indicated by block 606 in FIG. 8. The models are trained to identify the optimal hyper-plane discussed above.

It can thus be seen that the process of cleaning emails has been formalized into a problem of non-text data filtering and text data normalization. One embodiment filters an email by removing the parts in the email that are not needed for text mining, or other desired subsequent processes. One embodiment normalizes the email by converting the parts necessary for text mining (or the desired later processes) into texts in standard form, such as newspaper style texts, or other standard texts.

Headers, signatures, quotations (e.g., in forwarded messages or replied-to messages), program code, and tables, are normally irrelevant for data mining, and thus could be identified and removed in particular non-text filtering embodiments. However, they can be retained and other non-text items can be removed, as necessary, given the ultimate application. In any case, the basic text of a message is often needed for text mining and other such applications and is therefore retained.

One embodiment places text in standard form by separating paragraphs by line breaks; providing sentences with punctuation marks (such as a period, question mark, exclamation point, colons, ellipses); capitalizing the first word in sentences, and ensuring that all the words are correctly cased and spelled. Of course, a wide variety of additional or different things can be used to place text in standard form as well.

It should also be noted that the present discussion has proceeded with respect to handling emails in plain text format (non-structured data). Emails could be handled in other formats as well, such as HTML, and rich format text. However, these formats can also be reduced to plain text and many emails are stored in databases as plain text. Therefore, the discussion has proceeded along those lines.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data processing system, comprising:
   a non-text filtering component receiving electronic data including stored message data indicative of a text portion of an electronic message and filtering non-text data out of the electronic data to provide filtered text data free from the non-text data filtered by the non-text filtering component, the non-text filtering component comprising a plurality of classification models including a first classification model modeling a start of a portion of non-text data and a second classification model modeling an end of a portion of non-text data, wherein the non-text filtering component accesses the plurality of classification models to identify non-text data to be filtered; and
   a text normalization component, operably coupled to the non-text filtering component receiving the previously filtered text data from the non-text filtering component and normalizing the text portion in the filtered data to provide cleaned text data.

2. The data processing system of claim 1 wherein the non-text filtering component comprises:
   a header detection component for identifying and removing header data from the message data.

3. The data processing system of claim 2 wherein the plurality of classification models comprise:
   a header detection model including a header start model for identifying a start of header data in the message data, and a header end model for identifying an end of header data in the message data.

4. The data processing system of claim 1 wherein the non-text filtering component comprises:
   a signature detection component for identifying and removing signature data from the message data.

5. The data processing system of claim 4 wherein the plurality of classification models comprise:
   a signature detection model including a signature start model for identifying a start of signature data in the message data and a signature end model for identifying an end of the signature data in the message data.

6. The data processing system of claim 1 wherein the non-text filtering component including special characters comprises:
   a program code detection component for identifying and removing program code from the message data.

7. The data processing system of claim 6 wherein the plurality of classification models comprise:
   a program code detection model including a program code start model for detecting a start of program code in the message data and a program code end model for detecting an end of the program code in the message data.

8. The data processing system of claim 1 wherein the text normalization component comprises:
   a paragraph normalization component for normalizing paragraphs in the message data to obtain paragraph-normalized data;
   a sentence normalization component for normalizing sentences in the paragraph-normalized data to obtain sentence-normalized data; and
   a word normalization component for normalizing words in the sentence normalized-data.

9. The data processing system of claim 3 wherein the header detection model is trained based on a plurality of features, comprising at least a plurality of:
   a position feature, a positive word feature, a negative word feature, a number of words feature, a person name feature, an ending characters feature, a special pattern feature, and a number of line breaks feature.

10. The data processing system of claim 5 wherein the signature detection model is trained based on a plurality of features, comprising at least a plurality of:
    a position feature, a positive word feature, a number of words feature, a person name feature, an ending character feature, a special symbol pattern feature, a case feature, and a number of line breaks feature.

11. The data processing system of claim 7 wherein the program code detection model is trained based on a plurality of features, comprising at least a plurality of:
    a position feature, a declaration keyword feature, a statement keyword feature, an equation pattern feature, a function pattern feature, a function definition feature, a bracket feature, a percent of real words feature, an ending character feature, and a number of line breaks feature.

12. The data processing system of claim 8 wherein the paragraph normalization component accesses a classification model to normalize paragraphs, the classification model being trained on a plurality of features, the features comprising at least a plurality of:
    a position feature, a greeting word feature, an ending character feature, a case feature, a bullet feature, and a number of line breaks feature.

13. A method of processing message data indicative of an electronic message, comprising:
    analyzing the message line-by-line to determine whether each line is a start or an end of a section of one of a number of predefined types of non-text data, to identify the section of non-text data in the message data, wherein the section includes one or more complete lines of the message, wherein analyzing comprises:
    selecting a line of the message data;
    applying a first model to the selected line to determine whether the selected line is a start of one of the predefined types of non-text data;
    applying a second model to the selected line to determine whether the selected line is an end of one of the predefined types of non-text data; and
    removing the section of identified non-text data from the message data.

14. The method of claim 13 and further comprising:
    after identifying and removing the section of identified non-text data, normalizing the message data to a desired form.

15. The method of claim 13 wherein normalizing the message data comprises:
    normalizing paragraphs of the message data;
    after the paragraphs are normalized, normalizing sentences of the message data; and
    after the sentences are normalized, normalizing words in the message data.

16. A computer readable medium storing computer readable instructions which, when executed by a computer, cause the computer to perform steps of processing electronic message data, comprising:
    performing a plurality of ordered processing passes through a portion of the electronic message data previously identified as text data free from non-text data in an order comprising:
    normalizing the text data in the electronic message data by performing a plurality of normalization steps on the text data of increasing granularity.

17. The computer readable medium of claim 16 wherein the ordered processing passes further comprise, prior to normalizing text, identifying and removing predetermined types of non-text data by applying one or more classifier models to identify and remove headers, signatures and program code.

18. The computer readable medium of claim 16 wherein the text data of increasing granularity comprises:
   paragraphs, then sentences and then words.

* * * * *